UNITED STATES PATENT OFFICE.

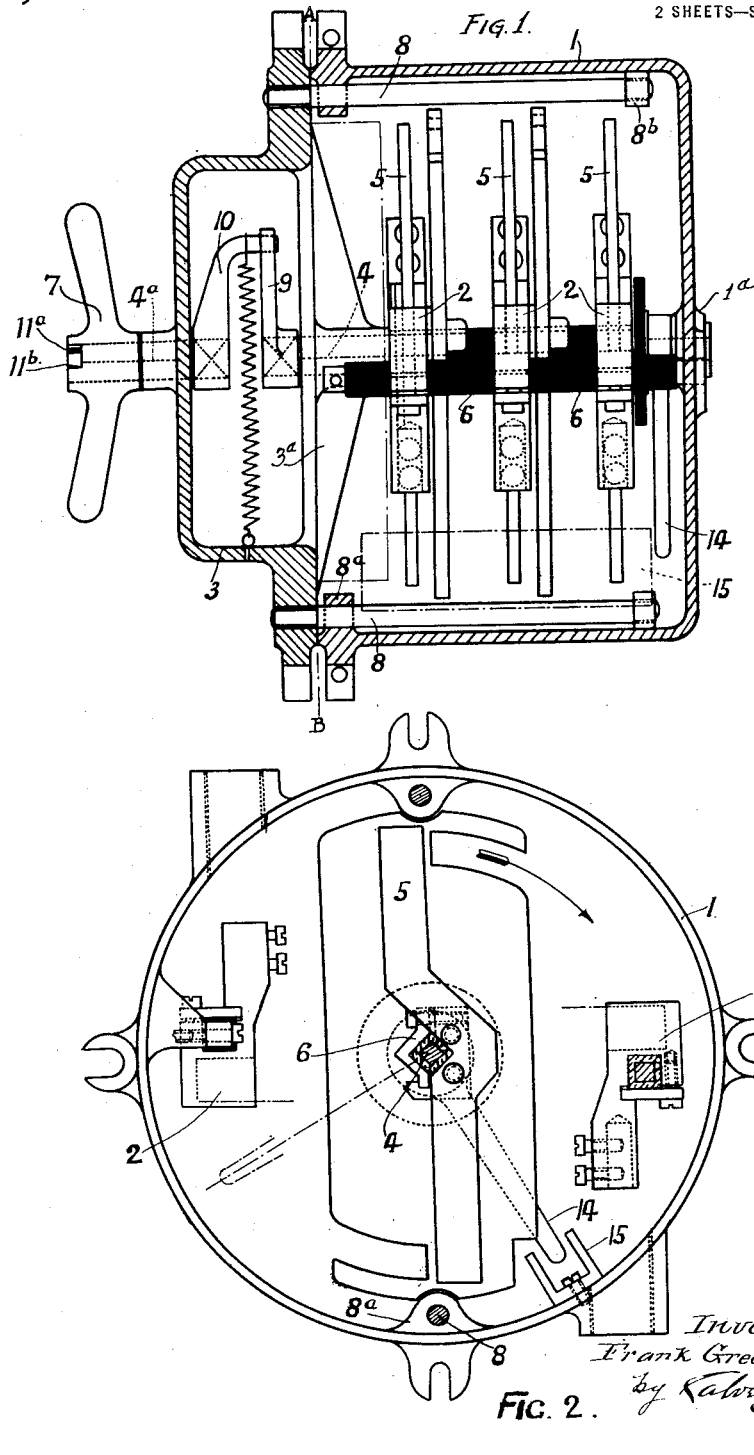

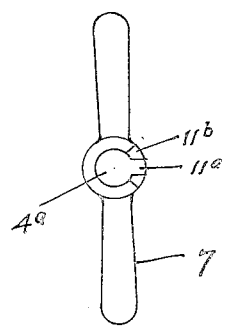
Fig. 1ª
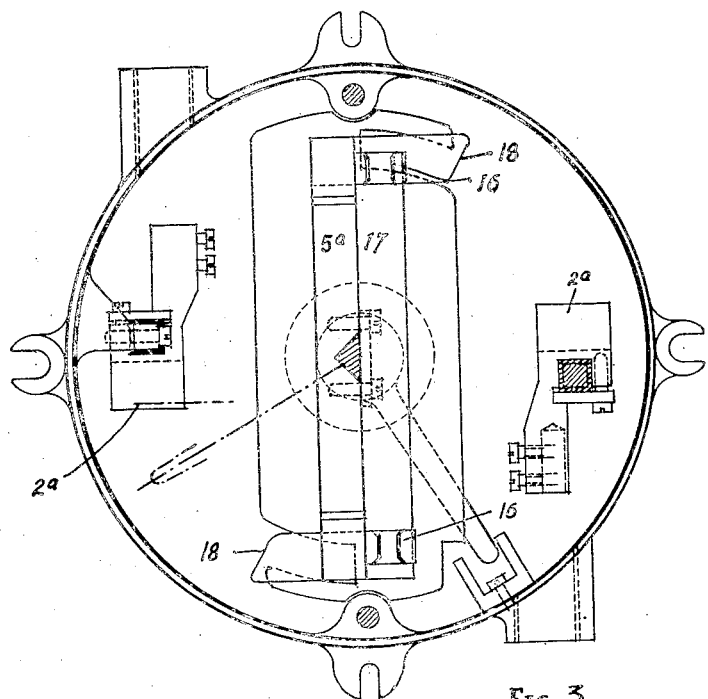
Fig. 3.

FRANK GREAVES WARBURTON, OF LONDON, ENGLAND.

ELECTRIC SWITCH.

1,363,938.  Specification of Letters Patent.  Patented Dec. 28, 1920.

Application filed January 27, 1920. Serial No. 354,490.

*To all whom it may concern:*

Be it known that I, FRANK GREAVES WARBURTON, a subject of the King of the United Kingdom of Great Britain and Ireland, and residing at London, England, have invented certain new and useful Improvements in Electric Switches, of which the following is a specification.

This invention relates to electric switches or switch fuses. An object of the invention is to provide an improved construction of switch in which the whole of the moving portion of the switch, and fuses, if fitted, which portion rotates in planes parallel to the switch base, is attached to the cover and removed with the cover, which will give by a rotary motion a wide break proportionately to its size and in which the cover of the switch casing cannot be removed with the switch on, and the switch cannot be operated with the cover off.

The casing is substantially cylindrical and is arranged for carrying opposite switch sockets connected with leads which may pass through gas-tight glands in the casing. Carried by the cover of the casing and supported by the casing is a spindle to which are clamped at intervals of its length switch knives embracing the same, extending on each side thereof and adapted on rotation of the spindle to be brought into and out of engagement with the radially extending switch sockets. The spindle is secured to the cover of the casing so that, when the cover is removed after the switch knives have been turned into off position, the spindle and switch knives are removed therewith.

The invention is illustrated in the accompanying drawings in which Figure 1 is a side elevation partly in section of one form of the improved switch. Fig. 2 a section on the line A—B of Fig. 1. Fig. 1ª an end elevation of the switch handle; and Fig. 3 a sectional view showing a modification including fuses.

As shown most clearly in Figs. 1, 1ª and 2, the switch comprises a substantially cylindrical casing 1 of which the base carries diametrically opposed switch sockets 2.

Journaled in a spider 3ª on the cover 3 and removably fitted in an apertured lug 1ª in the base of the casing 1 is a spindle 4 to which are clamped at axially spaced intervals three sets of switch knives 5 rotatable in planes parallel with the base and adapted, on rotation of the spindle, to be brought into and out of contact with the switch sockets 2. Between the switch knives 5 are insulating fillers 6 secured to, and rotatable with, the switch knives. It will be seen that with the construction illustrated a break extending through a substantial angle can be obtained. The spindle 4 is secured against axial movement relatively to the cover 3 by an arm 9, hereinafter referred to, abutting against the spider 3ª, so that when the cover 3 is removed, after the switch knives have been turned into off position, the spindle 4 and switch knives 5 are removed therewith. Guide rods 8 are fitted at their outer ends into the cover 3 and have a sliding fit in lugs 8ª in the casing, said rods being provided at their inner ends with nuts 8ᵇ to prevent the knives 5 from being wholly withdrawn when it is desired merely to inspect the knives.

The switch is operated by a handle 7 acting through a quick make and break device carried by the cover 3 and including a spring-influenced crank arm 10 keyed to a spindle 4ª journaled in the cover 3 and equipped with the handle 7, the crank arm 10 engaging an aperture on an arm 9 on the spindle 4, the handle 7 being free to move within limits on the spindle, the limits of movement being determined by a key 11ª fixed to the spindle and engaged by the faces of a slot 11ᵇ in the boss of the handle.

In turning the handle 7 to operate the switch the arm 10 is turned, causing the key 11ª to abut against one of the faces of the slot 11ᵇ. Continued turning of the handle 7 produces a turning movement of the arm 10 which now moves to the end of the elongated slot or aperture in the arm 9. By this time the arm 10 has just passed beyond the center, *i. e.*, beyond a line passing through the anchored end of the spring and the axis of the spindle 4 so that the spring at this point takes control, quickly pulling around the arms 10 and 9 and the spindle 4 causing a quick make or break of the switch knives, the arm 10 being free to take part in this movement without further movement of the handle 7 due to the play allowed between the key 11ª and the slot 11ᵇ.

To insure that the switch will not be operated unless the cover 3 is in place and in correct position on the casing 1, a lever 14 is keyed to the end of the spindle 4 remote from the cover and in the casing is fitted a channel-shaped member 15 in which the end of the lever is slidable. The channel-shaped member 15 terminates short of the base of the casing, so that, when the cover is not fully down on the casing, the lever 14 remains in the channel 15 and the switch cannot be operated. On the cover being pressed home the lever 14 is moved clear of the lower end of the channel 15 and then the switch may be turned on or off.

The switch may have any number of poles.

According to the modification illustrated in Fig. 3 the switch is arranged as a switch-fuse by mounting on the two ends of insulated bars 5ª taking the place of the switch knives 5 (Figs. 1 and 2), fuse clips 16 for accommodation of cartridge fuses 17 and extension knives 18 to engage with switch sockets 2ª corresponding to the sockets 2. As the fuses 17 are mounted on the bars 5ª they are withdrawn from the bars 5ª when the cover 3 is removed.

What I claim is:

1. In an electric switch, in combination, a casing having a base, switch sockets fitted to said base, a cover for said casing, a spindle carried by said cover, a plurality of sets of radially extending switch knives mounted on and rotatable with said spindle and engageable with said switch sockets, said spindle and said switch knives being removable from said casing with said cover, and a handle supported by said cover for rotating said spindle, the latter extending from said cover through the chamber of said casing into said base.

2. In an electric switch, in combination, a casing, switch sockets within said casing, a cover for said casing, a spindle carried by said cover, a plurality of sets of radially extending switch knives mounted on and rotatable with said spindle and engageable with said switch sockets, said spindle and said switch knives being removable from said casing with said cover, a handle supported by said cover for rotating said spindle, and means for preventing rotation of said switch save in the closed position of said cover, said means comprising an arm fixed to said spindle remote from said cover and a channel member in said casing in a position to be engaged by said arm excepting when said cover, when applied to the casing, is fully in place.

3. In an electric switch, in combination, a casing having a base, switch sockets fitted to said base, a cover for said casing, a spindle carried by said cover, said spindle extending through the chamber of said casing and engaging said base, a plurality of sets of radially extending switch knives mounted on and rotatable with said spindle and engageable with said switch sockets, said spindle and said switch knives being removable from said casing with said cover, a handle supported by said cover for rotating said spindle, and means for preventing rotation of said spindle save in the closed position of said cover, said means comprising an arm fixed to said spindle remote from said cover and a channel member in said casing in a position to be engaged by said arm excepting when said cover, when applied to the casing, is fully in place.

4. In an electric switch, in combination, a casing having a base, switch sockets within said casing, a cover for said casing, a spindle carried by said cover, said spindle extending through the chamber of said casing and engaging said base, radially extending switch knives mounted on and rotatable with said spindle and engageable with said switch sockets, said spindle and said switch knives being removable from said casing with said cover, a handle supported by said cover for rotating said spindle, and a quick make and break device interposed between said handle and said spindle.

In testimony whereof I have signed my name to this specification in the presence of two subscribing witnesses:

FRANK GREAVES WARBURTON.

Witnesses:
ERNOLD SIMPSON MOSELEY,
JOHN ALFRED HARTLEY.